Aug. 18, 1925.  1,549,898
J. P. BADER
VISCOSIMETER BATH
Filed Oct. 7, 1921   3 Sheets-Sheet 1
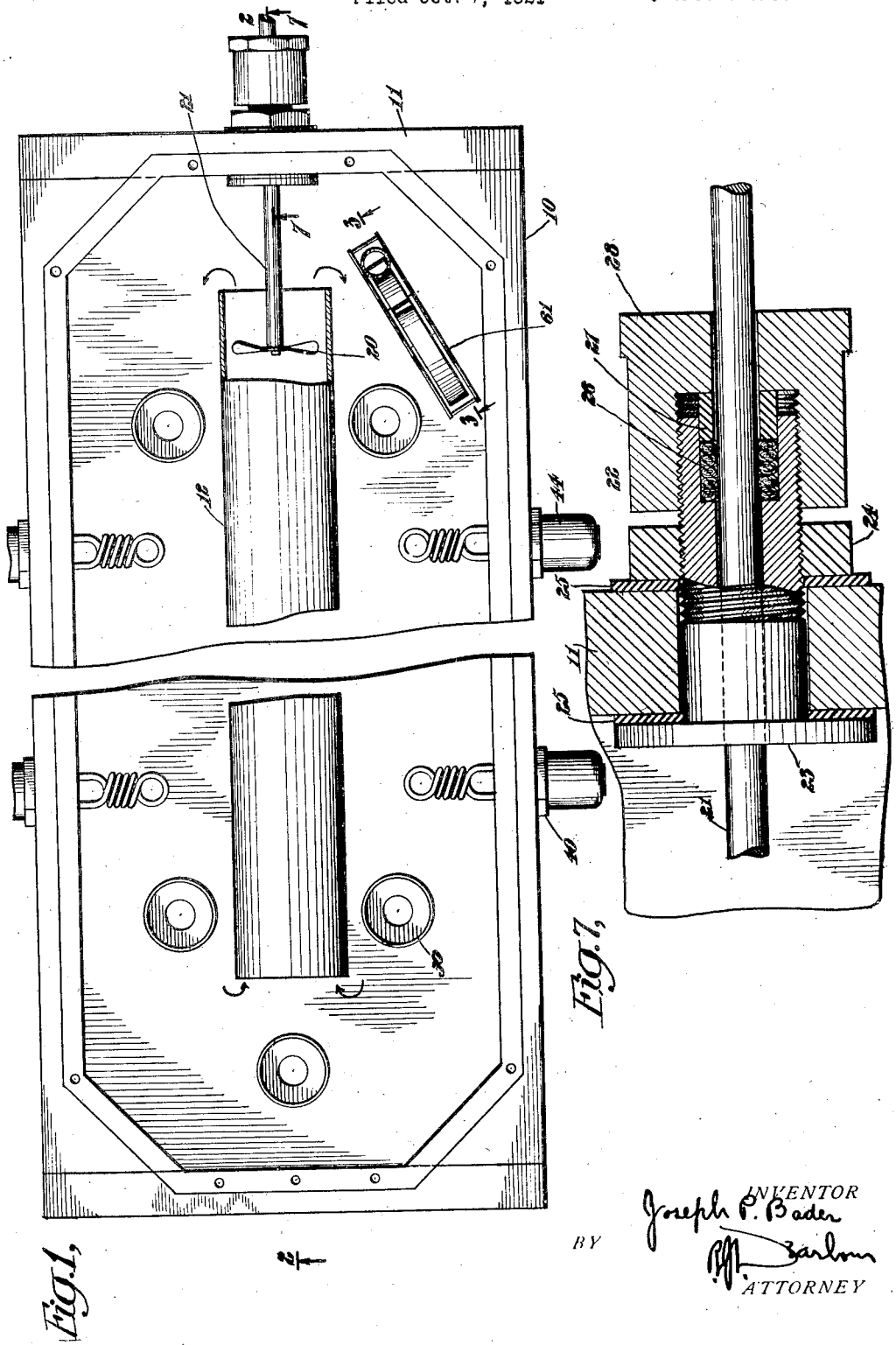
INVENTOR
Joseph P. Bader
BY
ATTORNEY

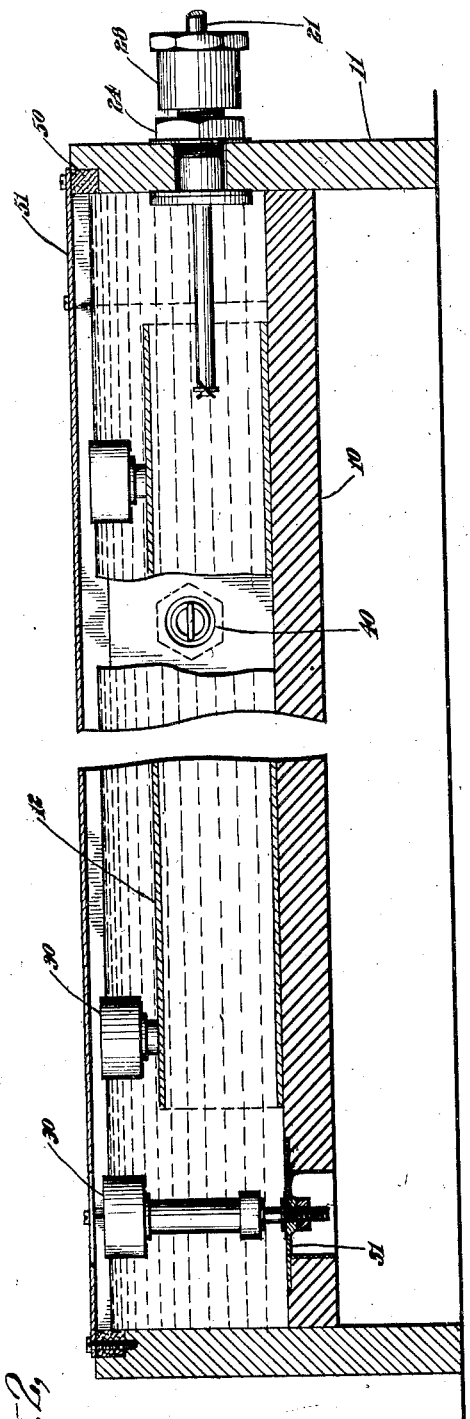

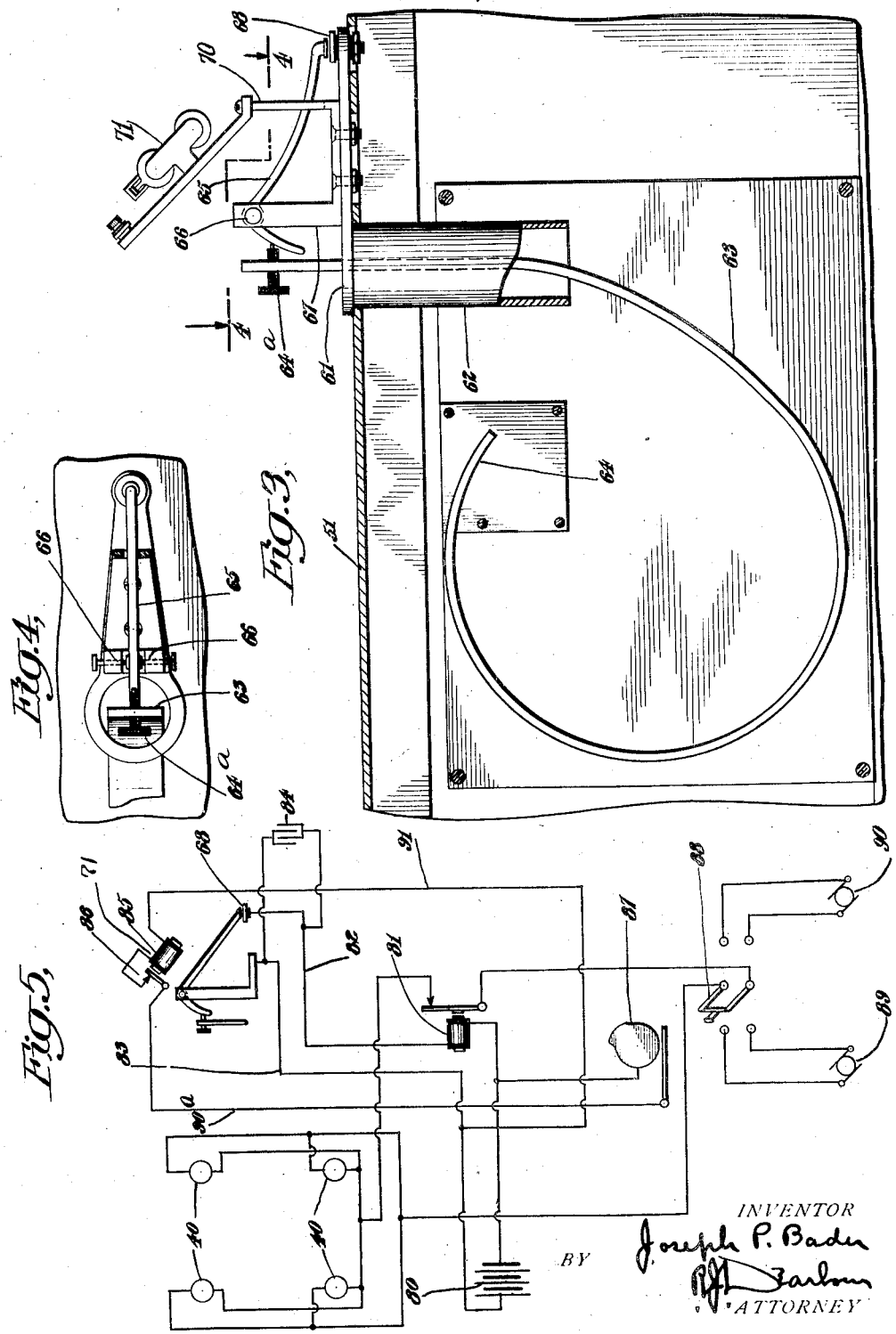

Patented Aug. 18, 1925.

1,549,898

UNITED STATES PATENT OFFICE.

JOSEPH P. BADER, OF NEW YORK, N. Y., ASSIGNOR TO THE TEXAS COMPANY, OF NEW YORK, N. Y., A CORPORATION OF TEXAS.

VISCOSIMETER BATH.

Application filed October 7, 1921. Serial No. 506,086.

*To all whom it may concern:*

Be it known that I, JOSEPH P. BADER, a citizen of the United States of America, and a resident of New York, county of New York, and State of New York, have invented certain new and useful Improvements in Viscosimeter Baths, of which the following is a specification, reference being had to the accompanying drawings, forming a part thereof.

This invention relates to improved means for maintaining a body of liquid at a desired constant temperature suitable for viscosimeter baths and the like.

One object of my invention is to provide a constant temperature liquid bath for viscosimeters which shall be automatically regulated to maintain the entire body of liquid in the bath at a pre-determined temperature.

Another object relates to improved means whereby a plurality of viscosity cups may be employed and the liquid heated in an improved and economical manner. According to this feature of the invention, a plurality of heating means is provided, controlled by a single regulator.

Another feature relates to means for circulating the liquid throughout the bath so that the liquid is brought into contact with the viscosity cups, the heaters, and the thermostat, in sequential order.

Other objects will appear as the description of the invention progresses.

Referring to the drawings, Figure 1 is a plan view of a viscosimeter bath system, embodying the features of my invention.

Figure 2 is a section thereof taken on the line 2—2 of Figure 1.

Figures 3 and 4 show details of the thermostat.

Figure 5 is a diagram of the electrical connections.

Figure 6 shows details of the electric heaters.

Figure 7 is an enlarged sectional view taken on the line 7—7 of Figure 1.

Like reference characters denote like parts in the several figures of the drawings.

Referring to the drawings, one embodiment of my invention comprises a casing 10 suitably supported on a plurality of legs 11 and lined to prevent improper escape of liquid. On the interior thereof in a position shown in Figures 1 and 2 is provided an elongated tube 12 extending for a portion of the length of the casing. Within the tube 12 and near one end thereof a propeller 20 is supported upon a propeller shaft 21 which extends through a stuffing box 22 supported in one end wall of the casing 10. The propeller shaft 21 is connected to an outside source of power (not shown), by means of which it may be driven at predetermined speed.

The stuffing box 22 comprises a hollow bolt member 23 extending through an orifice in the end wall of the casing 10 and concentric with the shaft 21, the head of the bolt being preferably on the interior of the casing. A nut 24 is screw threaded upon the bolt for maintaining in place a pair of washers 25, preferably of lead or the like, having orifices of such diameter as to insure a liquid tight joint. The outer end of the bolt 23 is provided with an annular recess in which is placed a suitable packing 26 and a conventional gland 27, these being held in place by an elongated nut 28 screw threaded upon the bolt 23. Thus the propeller shaft 21 may rotate freely, the joint being sealed by the lead washers 25 and the packing material in combination.

A plurality of viscosity cups 30 are supported in vertical position in spaced relation around the tube 12. Each cup is supported in a flange member 31 recessed into the floor of the casing 10, and comprises usual means to control the escape of liquid in a well known manner. Around the tank, preferably in the side walls of the casing 10, is inserted a plurality of electrical heaters 40, each comprising a base member 41 arranged to be screw threaded into the casing. Mounted in the base member 41 and electrically insulated therefrom is a heating element 42, the terminals of which are brought out to suitable binding posts 43. A cap 44 is attached to the outer surface of the base member 41 and it is provided with a suitable bushed hole 45, through which supply conductors may be passed. The heating element 42 may be provided with a cap on the interior of the tank, if desired, for diffusing the heat through the liquid.

The upper inside edge portion of the casing may be provided with a recess in which is inserted a heat insulating member 50 of soap-stone, or the like, upon which may be supported a cover plate 51, thus enclosing the interior of the casing. The cover plate is provided with suitable openings immediately above the respective viscosity cups.

A thermostat is supported upon the cover plate 51 and comprises a base member 61 having a tubular extension 62 extending downwardly into the interior of the tank. An active element 63 is supported at one of its extremities 64 on the interior of the tank and extends through the tubular portion 62 and the base member 61 to the outside of the tank. A thumb nut 64ª is secured to the free end of the active element 63 and is arranged to press against one end of a bell crank lever 65 pivotally mounted at a point 66 on a bracket 67. The other end of the lever 65 is provided with a face of platinum or the like, arranged to establish electrical contact with a contact 68, also of platinum or the like, mounted upon the base member 61 and electrically insulated therefrom. The bracket 67 is secured to the base plate 61 in any desired manner, as, for example, by machine screws, and has an arm 70 upon which is supported a vibrator 71 for a purpose which will be subsequently set forth.

Referring to Figure 5, the circuit of the thermostat contact includes a battery 80, winding of a control relay 81 and conductors 82—83. In shunt with the contact of the thermostat is a condenser 84 for absorbing the electrical discharge when the contact is opened and for preventing sparks at the contact. The vibrator 71 comprises an electro-magnet 85 whose circuit is arranged to be self interrupted by a contact 86, automatically opened when the magnet 85 is energized. The magnet 85 is in series with a timing mechanism 87 arranged to close the circuit at predetermined times. The relay 81 controls the current supply to the electric heaters 40, the source of energy being selected by means of a master switch 88. As shown, two sources, 89—90, are provided, the source 89 being of relatively higher voltage than the source 90.

In operation the interior casing 10 constitutes a tank or a vessel in which is placed the liquid constituting the bath. The amount of liquid is preferably such as to bring its level to a point just below the top of the viscosity cups 30, as shown in Figure 2. The liquid may be either oil or an emulsion of emulsifiable oil and water. The propeller 20 is now rotated at a suitable speed and sets up a current through the liquid in the direction of the arrows (see Fig. 1). The master switch 88 is closed into its left-hand position thereby closing the circuit of high voltage source 89 through the back contact of relay 81 to the heater elements 40. The heater elements may be either in parallel or series, the arrangement shown being a parallel arrangement. It is understood that any desired number of heaters may be employed as may be found necessary to secure the desired temperature.

In its normal position the active element 63 of the thermostat exerts a pressure against one end of the bell crank lever 65 and keeps the other end of the lever out of contact with the contact plate 68.

As the temperature rises, the element 63 of the thermostat gradually contracts and, as it becomes more constricted, releases pressure from the bell crank lever 65 and allows it to establish contact with the contact plate 68.

Adjustment of the temperature at which the contact is to be closed is predetermined by the setting of thumb screw 64ª and may be varied as desired by varying the position of this screw. The closure of the circuit at the contact point 68 energizes the winding of relay 81, and the consequent operation of this relay disconnects the circuit to the heaters 40. The temperature of the bath now gradually falls, and when it falls below a predetermined point, the active elements 63 of the thermostat causes the lever 65 to be lifted from engagement with the contact 68 and the winding of relay 81 to be de-energized. The consequent retraction of the armature of relay 81 thereupon again closes the circuit of heating elements 40 until the temperature again rises as previously described.

After the bath has been brought up to approximately a desired temperature, the switch 88 may be thrown into its opposite closed position, thereby disconnecting the high voltage source 89 and connecting the low voltage source 90. The current through the heaters 40 will then be sufficient to maintain the bath at approximately the desired temperature, accurate adjustments being obtained as before by the thermostat.

The buzzer or vibrator 71 is intermittently operated by the closure of a circuit by the timing mechanism 87, this circuit comprising the battery 80, timing mechanism 87, conductor 90ª, armature, back contact 86 and winding 85 of the vibrator 71, and conductor 91 to the opposite pole of battery 80. As soon as the armature of the vibrator 71 is attracted by the energization of its winding 85, the circuit is broken, being again established when the armature restores. The resulting rapid oscillation of the armature of the vibrator causes the bracket 67 and the bell crank lever 65 to be rapidly vibrated so long as the timer contact is closed. The operating mechanism of the thermostat is thereby made more responsive to fluctuations in temperature of the liquid, since sticking of the lever 65 to the contact 68 is effectually prevented by the vibration of the buzzer armature. The arrangement is such that the period of closure of the timer 81 is relatively short and thus if the lever 65 is down because the bath is cooling, the effect of the buzzing upon the temperature of the bath is negligible.

The operation of the bath may be discontinued by placing the switch 88 in its open position and stopping the propeller shaft 21 and the timer 87, care being taken that the timer 87 is stopped in its open position.

Apparatus of preferred form and construction has been illustrated and described for the purpose of showing a way in which this invention may be practiced, but the inventive thought upon which this application is based is broader than this illustrative embodiment. It is therefore understood that the scope of the invention is not to be limited by the present disclosure, reference being had to the appended claims for that purpose.

What is claimed is:

1. A viscosimeter bath comprising an elongated container for holding the bath fluid, a centrally disposed horizontal tube extending through a portion of the length of said container with its open ends spaced from the end walls thereof, means within said tube for causing a circulating current of fluid therethrough and a divided circulating current through the container on opposite sides of said tube and a plurality of viscosity cups disposed within the container on opposite sides of said tube and in the paths of the divided circulating currents.

2. A viscosimeter bath comprising an elongated container for holding the bath fluid, a centrally disposed horizontal tube extending through a portion of the length of said container with its open ends spaced from the end walls thereof, means within said tube for circulating a current of fluid through the tube and a divided current thereof through the container on opposite sides of the tube and a plurality of heaters disposed on opposite sides of the tube and in the path of the respective divided circulating currents.

3. A viscosimeter bath comprising an elongated container for holding the bath fluid, a centrally disposed horizontal tube extending throughout substantially the length of the container with the open ends of the tube spaced from the end walls of the container, means within said tube for circulating a current of fluid therethrough and a divided current of fluid through the container on opposite sides of the tube and a plurality of viscosity cups and a plurality of electric heaters disposed within said container on opposite sides of the tube and in the paths of the divided fluid currents.

4. A viscosimeter bath comprising an elongated container for holding the bath fluid, a centrally disposed horizontal tube extending throughout substantially the length of the container with the open ends of the tube spaced from the end walls of the container, means within said tube for circulating a current of fluid therethrough and a divided current of fluid through the container on opposite sides of the tube, a plurality of viscosity cups and a plurality of electric heaters disposed within said container on opposite sides of the tube and in the path of the divided fluid current and a single thermostat immersed in the fluid bath in the path of one of the divided circulating currents for regulating the operation of the heaters.

5. A viscosimeter bath comprising an elongated container for holding the bath fluid, a plurality of viscosity cups disposed at distributed points within the container, a plurality of heaters immersed in the fluid bath and located at distributed points but spaced from said viscosity cups, a horizontal cylindrical tube fixed to the bottom of said container along its longitudinal center line and having open ends respectively spaced from the end walls of the container, and a rotating propeller disposed within said cylindrical tube near one end thereof for creating a steady directed circulation through the tube and from thence in divided streams past the viscosity cups and heaters on opposite sides of said circulation tube.

6. A viscosimeter bath comprising an elongated container for holding the bath fluid, a plurality of viscosity cups disposed at distributed points within the container, a plurality of heaters immersed in the fluid bath and located at distributed points but spaced from said viscosity cups, a horizontal cylindrical tube fixed to the bottom of said container along its longitudinal center line and having open ends respectively spaced from the end walls of the container, a rotating propeller disposed within said cylindrical tube near one end thereof for creating a steady directed circulation through the tube and from thence in divided streams past the viscosity cups and heaters on opposite sides of said circulation tube, and a thermostat immersed in the fluid bath at one side of said tube in the path of one of the divided streams and operable to automatically regulate the several heaters whereby a constant and uniform temperature is maintained throughout the bath.

7. A viscosimeter bath comprising a container for holding the bath fluid, a viscosity cup, a heater and thermostat immersed in said bath, cooperating electrical contact members adapted to make or break contact in accordance with the operation of said thermostat, an electric control system in circuit with said contact members for regulating the operation of the heater and vibratory means adjacent said contact members for preventing sticking and sluggish operation thereof.

8. A viscosimeter bath comprising a container for holding the bath fluid, a viscosity cup, a heater and thermostat immersed in said bath, cooperating electrical contact members adapted to make or break contact in accordance with the operation of said thermostat, an electrical control system in circuit with said contact members for regulating the operation of the heater, vibratory means adjacent said contact members for preventing sticking and sluggish operation thereof, and timing means for periodically effecting the actuation of said vibratory means.

9. In a constant temperature bath, a tank, electric means for heating the liquid bath in said tank, thermostatically controlled means responsive to changes of temperature of the liquid bath for regulating the operation of said electric means, and vibratory means operatively connected with the thermostatically controlled means for insuring the operation thereof.

In witness whereof I have hereunto set my hand and seal this 3rd day of Oct. 1921.

JOSEPH P. BADER.